Dec. 9, 1969　　　B. M. LEADLEY　　　3,482,716
TRANSPORTING VEHICLES WITH EXPANDABLE BODIES AND
SELF-CARRIED OVERHEAD CRANE EQUIPMENT
Filed May 31, 1967　　　　　　　　　　　　　　6 Sheets-Sheet 1
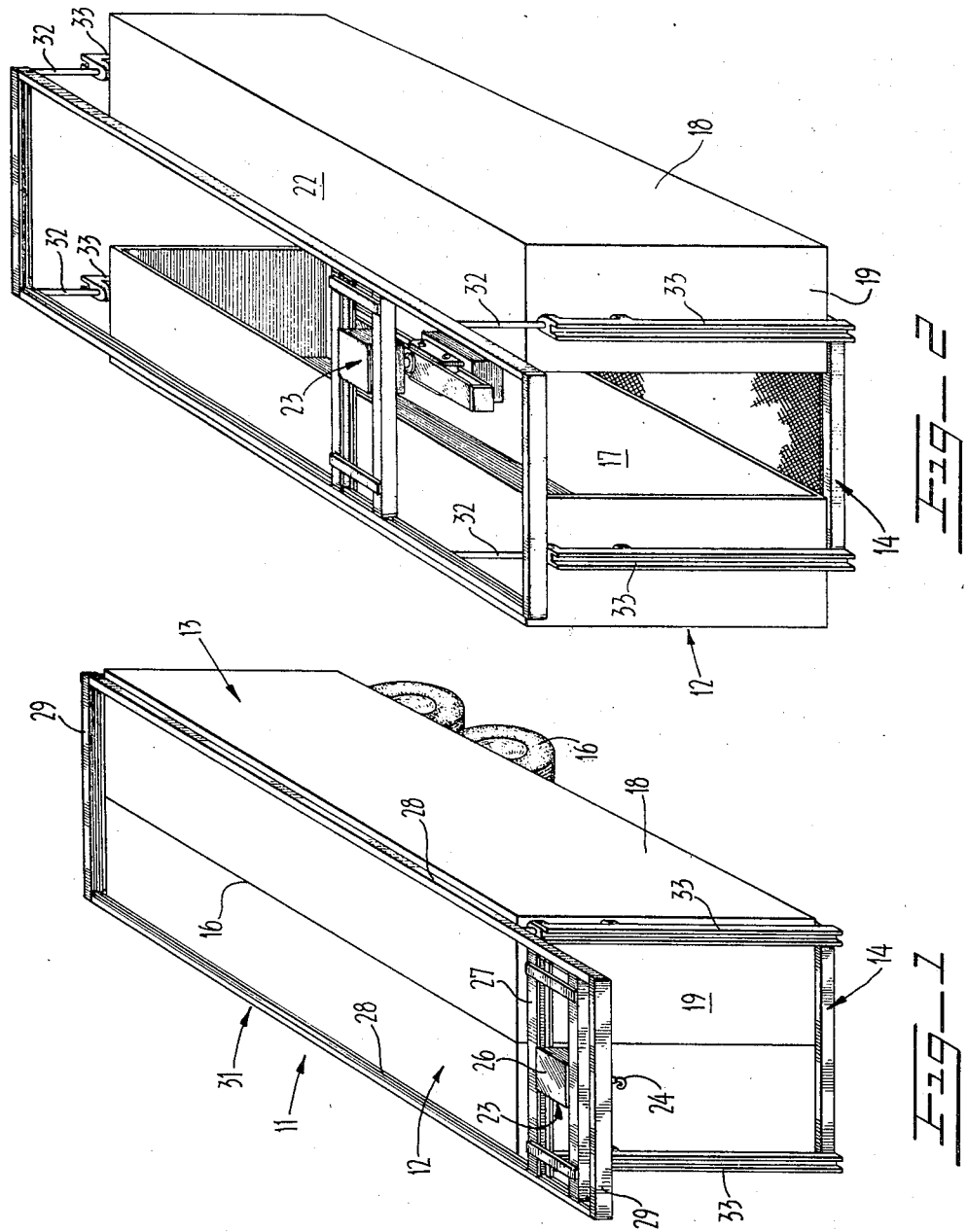
INVENTOR.
BERTRAM M. LEADLEY
BY
ATTORNEYS

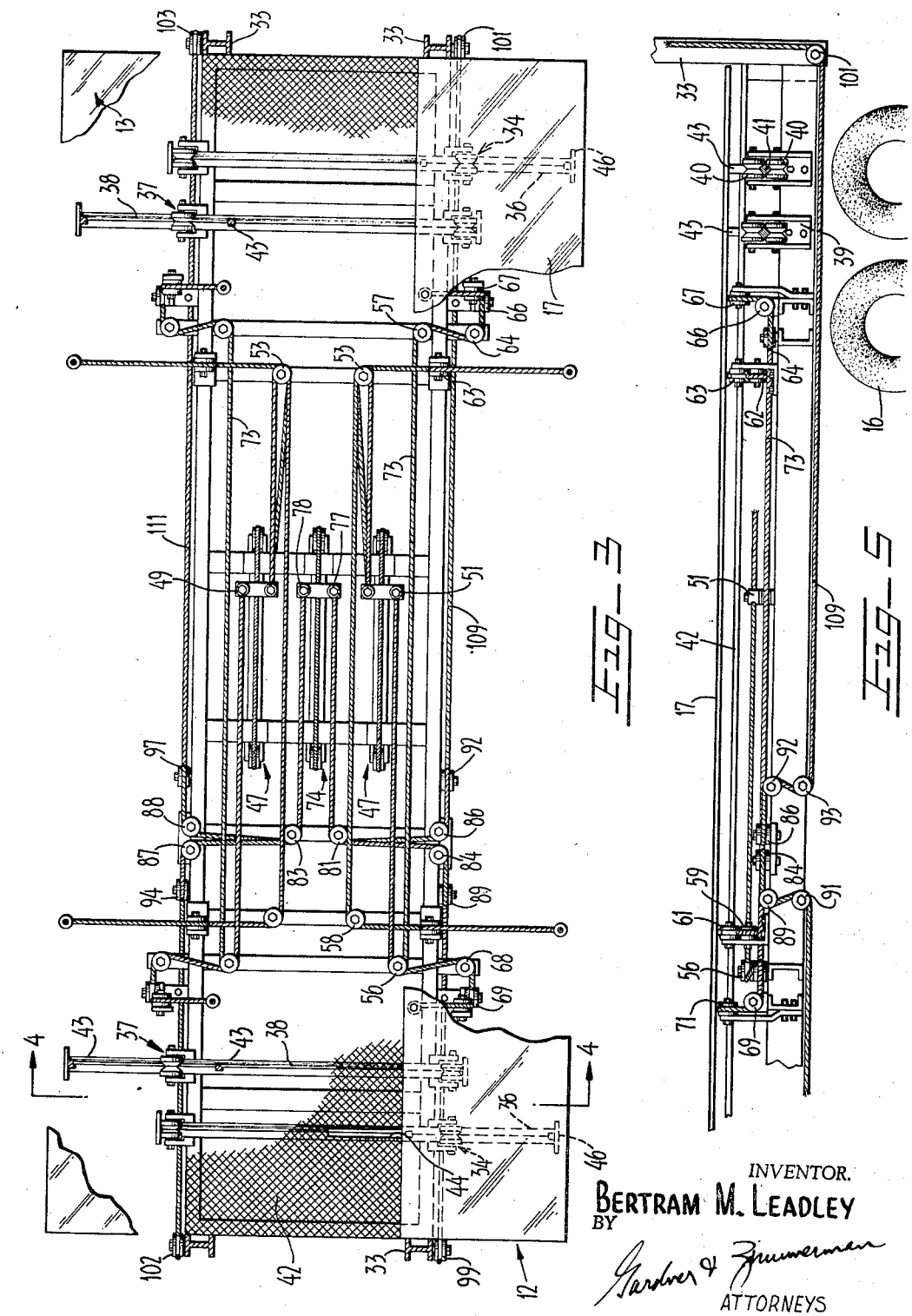

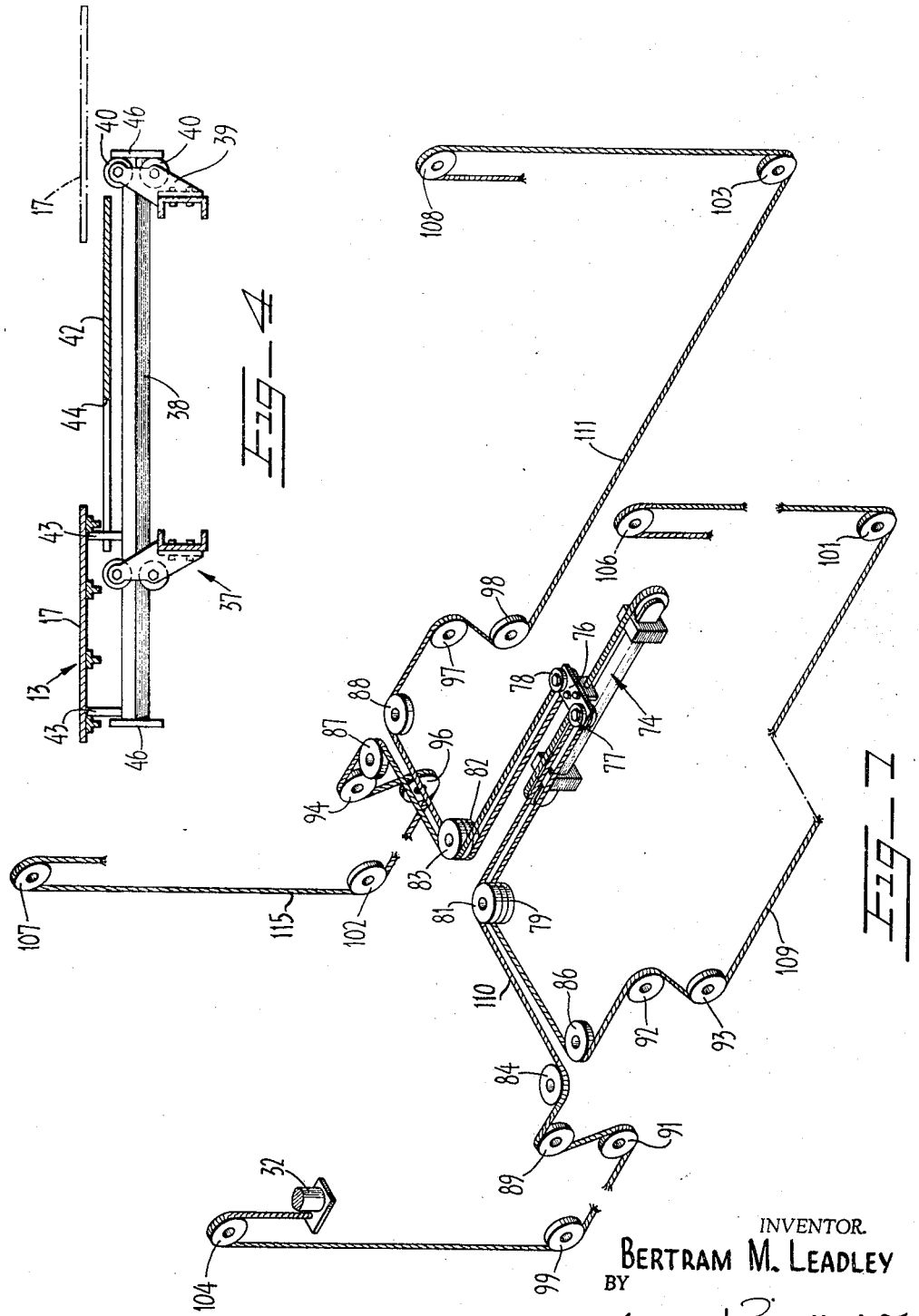

Dec. 9, 1969  B. M. LEADLEY  3,482,716
TRANSPORTING VEHICLES WITH EXPANDABLE BODIES AND
SELF-CARRIED OVERHEAD CRANE EQUIPMENT
Filed May 31, 1967  6 Sheets-Sheet 4
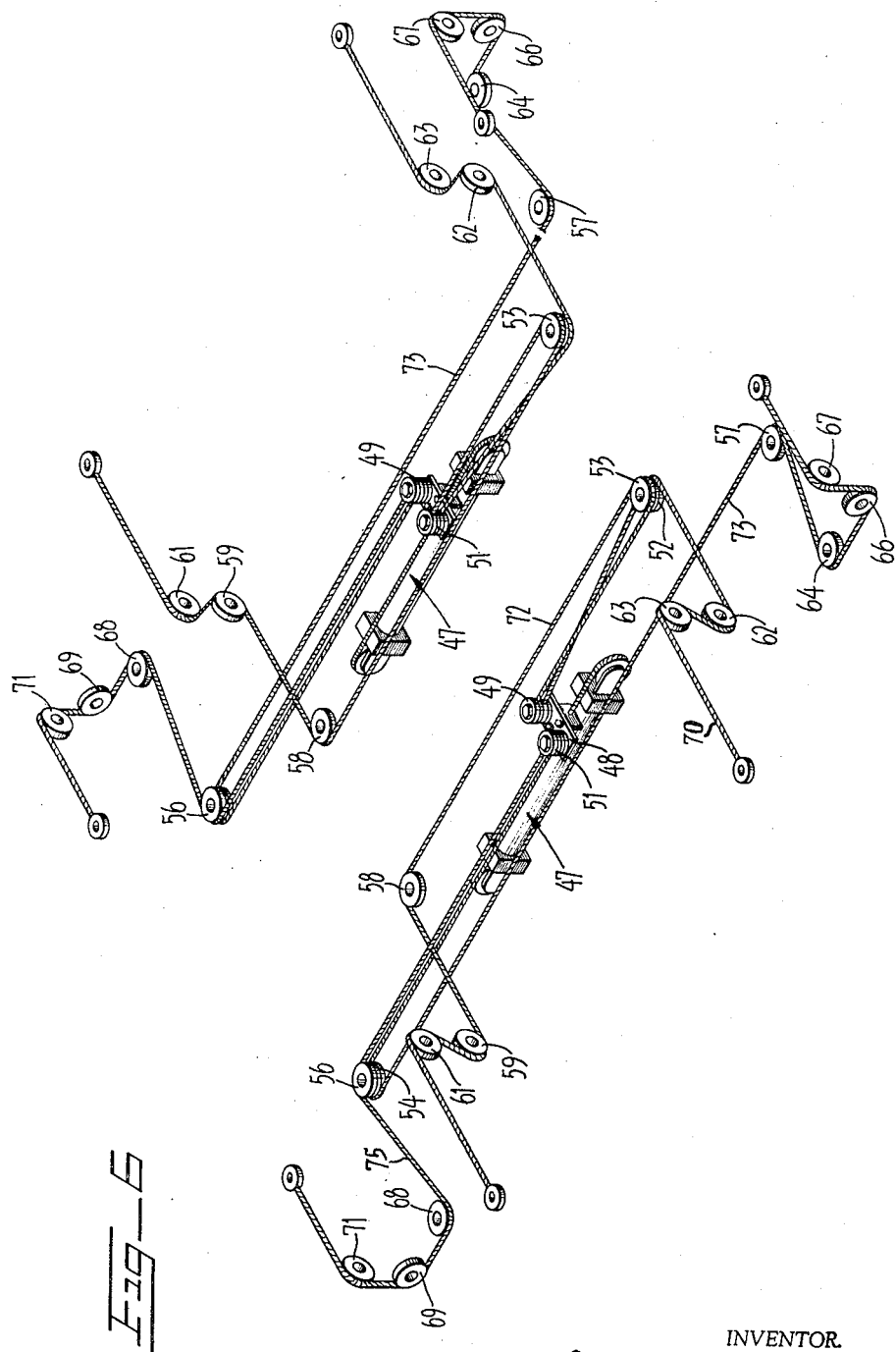
INVENTOR.
BERTRAM M. LEADLEY
BY
*Gardner & Zimmerman*
ATTORNEYS

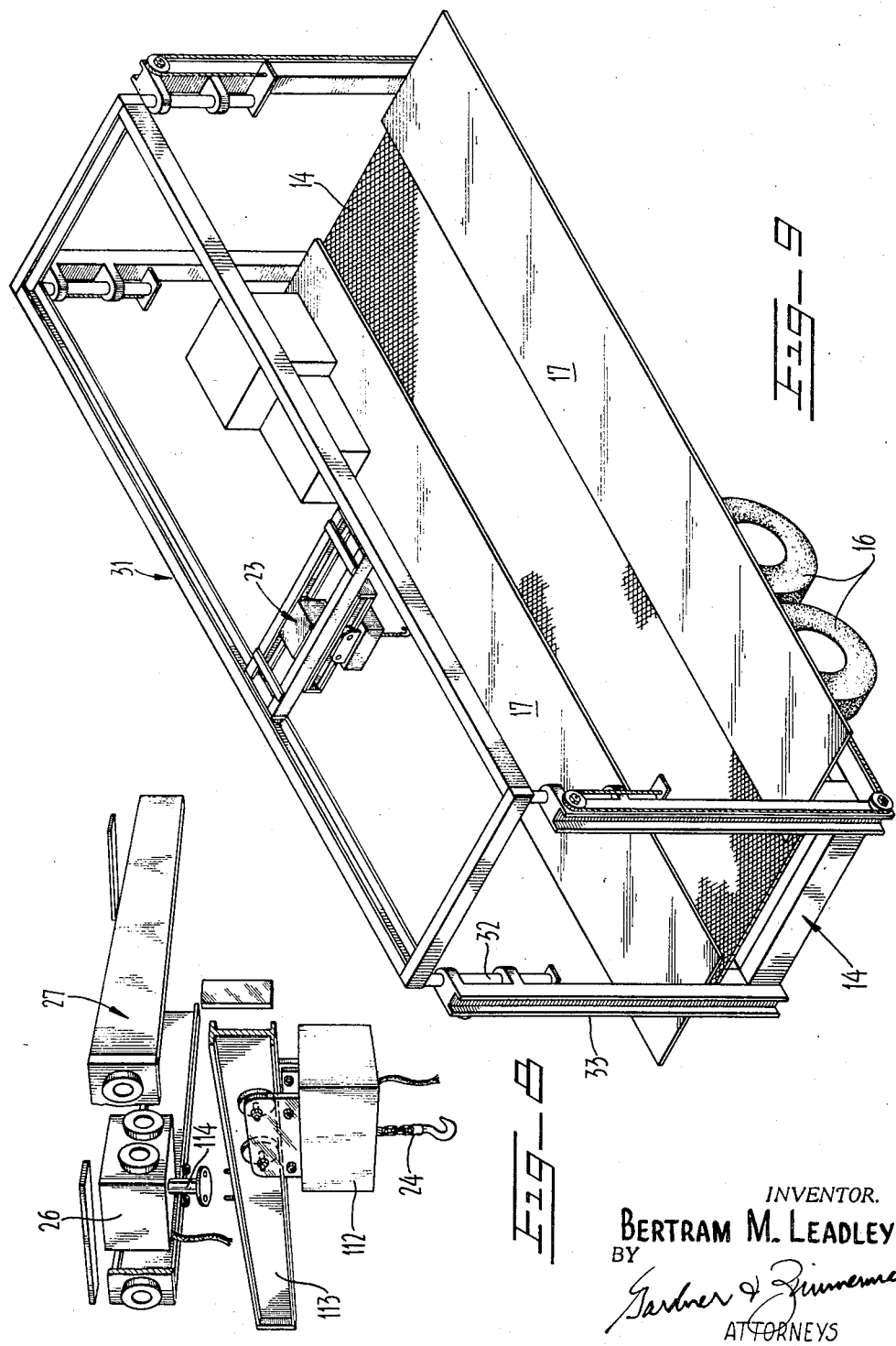

Dec. 9, 1969   B. M. LEADLEY   3,482,716
TRANSPORTING VEHICLES WITH EXPANDABLE BODIES AND
SELF-CARRIED OVERHEAD CRANE EQUIPMENT
Filed May 31, 1967   6 Sheets-Sheet 6
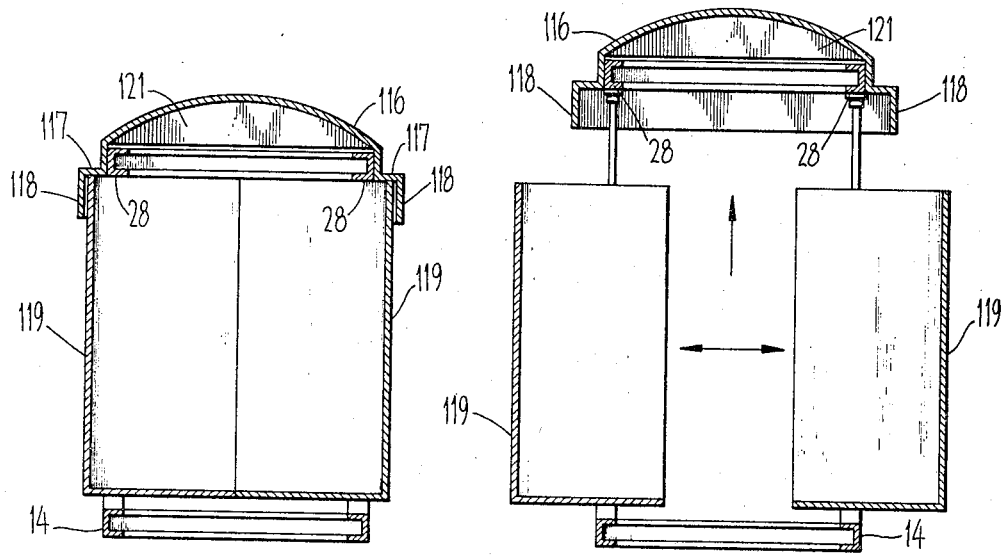
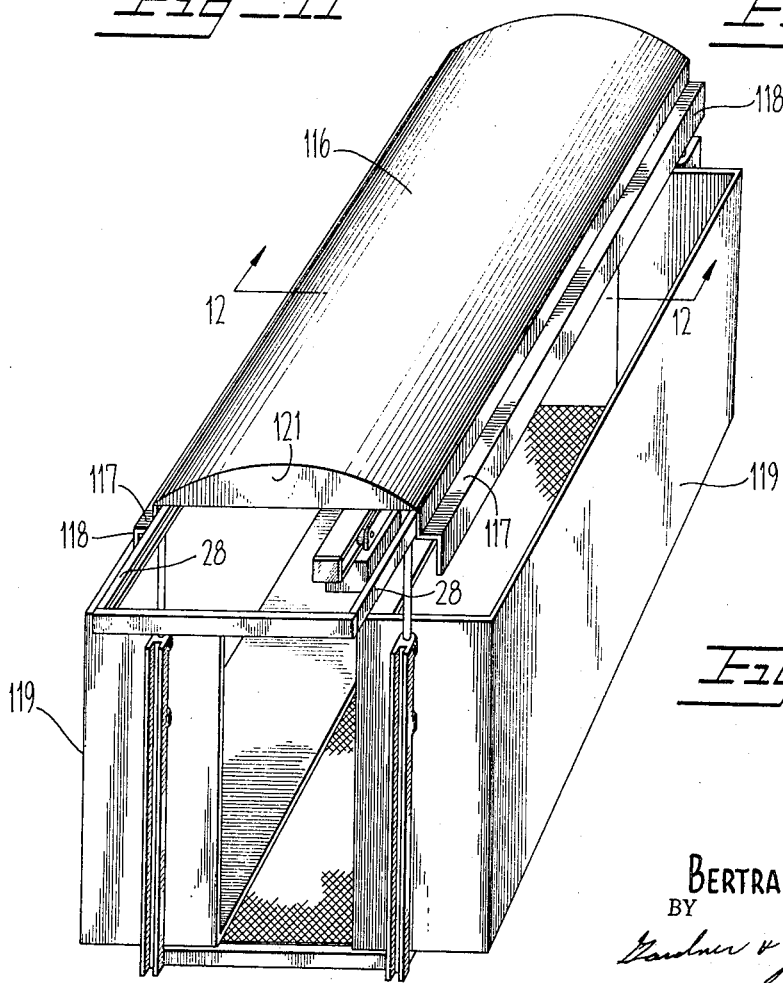
INVENTOR.
BERTRAM M. LEADLEY
BY
ATTORNEYS United States Patent Office 3,482,716
Patented Dec. 9, 1969

3,482,716
TRANSPORTING VEHICLES WITH EXPANDABLE BODIES AND SELF-CARRIED OVERHEAD CRANE EQUIPMENT
Bertram M. Leadley, 27084 Underwood Ave., Hayward, Calif. 94544
Continuation-in-part of application Ser. No. 607,567, Jan. 5, 1967. This application May 31, 1967, Ser. No. 642,437
Int. Cl. B60p *1/46;* B62d *33/08*
U.S. Cl. 214—75                                     8 Claims

ABSTRACT OF THE DISCLOSURE

A body arrangement for trucks, semi-trailers, etc., which enables the body to be transversely expanded on both sides of its longitudinal center line to provide a central aisle for access to the body interior. Self-carried overhead crane equipment is provided to facilitate loading and unloading of the body interior via the access aisle. Subsequent to loading, the expanded body is closed to a normal transportable condition. The expandable body and self-carried overhead crane arrangement is particularly well suited to multiple stop unloading of loaded bulk slippage containers and loading of unloaded bulk containers without unloading and reloading of containers consigned to other delivery destinations.

CROSS-REFERENCE TO A RELATED APPLICATION

This application is a continuation-in-part of my prior copending application Ser. No. 607,567, filed Jan. 5, 1967, now abandoned, and entitled Transporting Vehicles With Expandable Bodies and Self-Carried Overhead Crane Equipment.

SPECIFICATION

This invention relates to trucks, trailers, and equivalent vehicles employed in the transport of a wide variety of shipping units, and is more particularly directed to an expandable body and self-carried overhead crane arrangement for such vehicles which facilitates the ready loading and unloading thereof without requirement of auxiliary handling equipment and manpower other than the truck driver.

A long felt need has existed for truck transportation equipment designed to handle shipping units from distribution warehouses, or manufacturing plants, to retail stores, or other distribution outlets, on a regular and pick-up basis in a minimum of time and with a minimum of manpower. Heretofore, for example, it has not been practical to ship large quantities of items packaged in bulk containers unless a two way service, i.e., delivery of loaded containers and pick-up of empties, is provided with each stop. Where multiple stops are involved, the two service must be accomplished without substantial unloading and reloading at each separate stop in order to be feasible. Moreover, the loading and unloading of bulk containers generally entails the use of heavy handling equipment such as cranes, and the like. Many stores, or other distribution outlets, do not have such handling equipment such that shipment of items thereto in bulk containers cannot be accomplished unless the transporting vehicle has its own handling equipment. Conventional trucks or equivalent transporting vehicles do not have their own handling equipment.

It is therefore an object of the present invention to provide transportation vehicles for the shipment of bulk containers and other shipping units on a regular delivery and pick-up basis.

Another object of the invention is the provision of a transportation vehicle having a body which is selectively laterally expandable on opposite sides of its longitudinal center line to provide a central aisle for movement of shipping units into and out of the vehicle.

Still another object of the invention is to provide a vehicle of the class described having overhead crane equipment for moving the shipping units along the aisle.

It is yet another object of the invention to provide a vehicle of the class described wherein the crane equipment may be elevated relative to the vehicle body to any height required to permit overhead crane operations.

A further object of the invention is the provision of vehicular transporting equipment of the type outlined hereinbefore wherein the crane hoist may be moved along the entire length of the vehicle body, laterally to either side of the longitudinal center line of the body, as well as beyond the end of the body, to thereby provide a complete facility for moving shipping units and out of the expanded vehicle body without auxiliary handling equipment.

It is a still further object of the invention to provide an expandable vehicle body with elevatable crane equipment wherein expansion of the body and elevation of the crane equipment may be expeditiously and reliably effected by relatively simple and economical pneumatically actuated cable systems.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted.

FIGURE 1 is a perspective view of a closed semi-trailer van having an expandable body and overhead crane equipment in accordance with the present invention, the body and crane equipment being illustrated in their normal positions.

FIGURE 2 is a perspective view similar to FIGURE 1, but illustrating the van body and overhead crane equipment in extending and elevated positions to facilitate the ready loading and unloading of the van.

FIGURE 3 is a plan view of the base of the van body with portions broken away to illustrate the mechanism for expanding the body and elevating the crane equipment.

FIGURE 4 is a sectional view taken at line 4—4 of FIGURE 3.

FIGURE 5 is an elevational view of the base of the van body with portions broken-away to illustrate further details of the expanding and elevating mechanism.

FIGURE 6 is a perspective view of a pneumatically actuated cable system of the body expanding mechanism.

FIGURE 7 is a perspective view of a pneumatically actuated cable system of the crane equipment elevating mechanism.

FIGURE 8 is a fragmentary perspective view of the overhead crane equipment.

FIGURE 9 is a perspective view of a modified form of van body, the body and crane equipment being in their extended and elevated operable positions.

FIGURE 10 is a perspective view of another modified van body the body and crane being in their extended and elevated operable positions.

FIGURE 11 is a cross-sectional view of the van body of FIGURE 10 showing the body in its normal unexpanded position.

FIGURE 12 is a cross sectional view similar to FIGURE 11 and taken on a plane indicated by line 12—12 in FIGURE 10 illustrating the van body in its extended position.

Referring first to FIGURES 1 and 2, there is shown a transporting vehicle in accordance with the present invention which in the exemplary case hereinafter described is depicted as a closed semi-trailer van 11. It is to be understood that the principles of the invention apply equally as well to other forms of transporting vehicles and that the invention is by no means limited to the closed van embodiment. The van 11 is defined by two separate half body portions 12, 13 which are carried upon a chassis 14 provided with wheel 16 in a conventional manner. The body portions 12, 13 abut each other at a central longitudinal part line 16 to thus define the closed van. Each body portion preferably includes a rectangular base portion 17 with side wall 18 and end walls 19 extending upward from the margin thereof. Each body portion further includes a top wall 22 secured in bridging relation to the upper edges of the side and end walls. Thus the inner side of each body portion is open, but when the edges of the walls marginally defining the inner side openings of the respective body portions are in abutment, as shown in FIGURE 1, the body portions form the closed van body.

In accordance with the particularly salient aspects of the invention, the van is provided with its own overhead crane equipment, as depicted at 23. The crane equipment preferably includes a hoist 24 suspended from a carriage 26 which is movable along a transverse gantry 27, in turn movable along parallel spaced longitudinal rails 28 carried atop the van. The overall assembly is selectively elevatable with respect to the van to appropriate heights to conduct hoisting operations. In this regard, the longitudinal rails 28 are best interconnected at their opposite ends by transverse stop rails 29 so as to define therewith a rectangular frame 31. Pairs of rods 32 depend from the rails adjacent their opposite ends and are vertically slidable in posts 33 which project upward from the corners of the chassis 14. The rails 28 are of sufficient length to extend beyond the ends of the van.

The body portions 12, 13 of the van are preferably mounted on the chassis 14 for translation transversely thereof. A control system is associated with the body portions in a manner subsequently described to selectively translate the body portions apart transversely outward to extended positions as shown in FIGURE 2, or together transversely inward to the normal abutting positions depicted in FIGURE 1. When the body portions are extended, a central longitudinal aisle is provided which affords ready access to the body portions for loading and unloading operations of the type discussed hereinbefore. When the van is in its normal closed condition, as shown in FIGURE 1, the rails 28 of the crane equipment rest on the top walls 22 of the van body portions, and the gantry 27 is positioned beyond an end of the van. However, a control system is associated with the frame 31, in a manner subsequently described, to raise same to the desired elevated hoisting positions, such as shown in FIGURE 2. With the crane equipment elevated and the van body extended, the hoist 24 may be moved through the central aisle and appropriately maneuvered to effect substantially any desired loading or unloading operation. While it is greatly preferred that the body portions be transversely extendable to provide the central aisle, it will be recognized that in many situations the elevatable crane equipment can be advantageously used to load and unload a van without the van having to be capable of expanding.

A preferred structural arrangement for facilitating translation of the body portions 12, 13 relative to the chassis 14 is illustrated in FIGURES 3–5. As shown therein, first and second transversely spaced pairs of roller assemblies 34 are secured to the chassis 14 adjacent its opposite ends to rollably support a pair of rails 36 respectively carried adjacent the opposite ends of body portion 12. Similarly, third and fourth transversely spaced pairs of roller assemblies 37 are provided on the chassis to rollably support a pair of rails 38 respectively secured adjacent the opposite ends of body portion 13. Each of the roller assemblies 34, 37 comprises a pair of parallel spaced bracket plates 39 which project upwardly and outwardly from a lower side portion of the chassis 14. A pair of vertically spaced rollers 40 are journalled between the plates 39. The rollers are in peripheral abutment and have a V-shaped cross section so as to define a diamond shaped aperture 41 therebetween at a level closely subjacent the top plate 42 of the chassis. Each of the rails 36, 38 is then of diamond cross-section and extends through the apertures 41 of a corresponding pair of the roller assemblies 34, 37. The rails are secured to the bases of the body portions 12, 13 in spaced subjacent relation, as by means of depending spacers 43. The chassis top plate 42 is then provided with transversely inwardly extending slots 44 to accommodate the spacers. In addition, the opposite ends of each rail are provided with stops 46 for abutting the roller assemblies when the body portions are at the opposite extremes of their transverse movement.

With the body portions 12, 13 thus rendered transversely translatable relative to the chassis 14, a control system is provided for selectively effecting translation of the body portions between the extremes depicted in FIGURES 1 and 2. The system is preferably, but not necessarily, a fluid actuated cable pulling system as best shown in FIGURE 6. Basically such system includes a pair of conventional cable cylinders 47, one associated with each of the body portions 12, 13. The cylinders may be hydraulically actuated, or more preferably of the pneumatically actuated variety, such as a "Tol-Air" cable cylinder as manufactured by Tol-O-Matic, Inc., Minneapolis, Minn. In any event the cylinders 47 are mounted on the chassis 14 beneath the top plate 42, respectively adjacent the opposite sides thereof. Each cylinder is provided with a carriage 48 which is pneumatically translatable back and forth longitudinally of the chassis. A pair of cable fasteners 49, are mounted on the carriage and a stacked pair of pulleys 52, 53 are mounted upon the chassis for rotation about a vertical axis longitudinally spaced from a first end of the cylinder. Similarly, a stacked pair of pulleys 54, 56 are mounted upon the chassis for rotation about a vertical axis longitudinally spaced from the second end of the cylinder. Single pulleys 57, 58 are mounted upon the chassis for rotation about vertical axes longitudinally spaced from the first and second ends of the cylinder. A pair of vertically spaced pulleys 59, 61 are mounted on the chassis for rotation about longitudinal axes at a position outwardly transversely spaced from pulley 58. A pair of vertically spaced pulleys 62, 63 are similarly mounted at a position outwardly transversely spaced from stacked pulleys 52, 53. A series of pulleys 64, 66, 67 respectively rotatable about vertical, transverse, and longitudinal axes are mounted on the chassis at a location outwardly transversely spaced from pulley 57. A second similar series of pulleys 68, 69, 71 are mounted on the chassis at a location outwardly transversely spaced from stacked pulleys 54, 56. A cable 72 is secured to carriage fastener 49 and is extended around pulley 52, under pulley 62, and outwardly over pulley 63 into securance with the base of one body portion 12. A second cable 70 is secured to fastener 49, extended around pulley 53, outwardly around pulley 58, under pulley 69, and outwardly over pulley 61 into securance with the base of body portion 12. The cables 72 and 70 serve to pull the body portion 12 transversely inward in a manner subsequently described. A third cable 73 is secured to carriage fastener 51 and is extended reentrantly around pulley 54, outwardly around pulley 57, longitudinally around pulley 64, upwardly under pulley 66, and inwardly over pulley 67, into securance with the base of body portion 12. A fourth cable 75 is extended outwardly around pulley 56, longitudinally around pulley 68, upwardly under pulley 69, and inwardly over pulley 71 into securance with the base of body portion 12. The cables 73 and 75 serve to pull the body portion 12 transversely outward in a manner subsequently described.

Considering now the operation of the control system described hereinbefore, assume that the carriage 48 is positioned at the right end of the cylinder 47 as shown in FIGURE 6. At this time the body portion 12 is in its extended position. When the carriage is pneumatically translated towards the left end of the cylinder, the ends of cables 70 and 72 secured to the body portion are pulled inwardly, while the ends of cables 73 and 75 secured to the body portion are played out. The body portion 12 is consequently moved transversely inward. When the carriage is pneumatically translated towards the right end of the cylinder, the aforementioned ends of cables 70 and 72 are played out. As a result, the body portion 12 is moved transversely outward. It should be noted that the second cylinder 47 cooperates with a second system of cables and pulleys identical to that previously described to effect movement of the other body portion transversely outward and inward.

The control system for elevating the crane equipment 23 is likewise preferably of the fluid actuated cable pulling type. As best shown in FIGURE 7, the system advantageously includes a pneumatically actuated cable cylinder 74 similar to the cylinders 47. The cylinder 74 is mounted substantially centrally of the chassis 14 beneath the top plate 42 and includes a carriage 76 which is pneumatically translatable longitudinally of the chassis. A pair of transversely spaced fasteners 77, 78 are mounted upon the carriage for securing a cable thereto and stacked pairs of pulleys 79, 81 and 82, 83 are mounted on the chassis for rotation about vertical axes at transversely spaced positions longitudinally spaced from one end of the cylinder 74. A pair of longitudinally spaced pulleys 84, 86 are mounted for rotation about vertical axes at a position transversely spaced to one side of the cylinder. A second pair of pulleys 87, 88 are similarly mounted at a position transversely spaced to the opposite side of the cylinder. Pairs of vertically spaced pulleys 89, 91 and 92, 93 are respectively mounted for rotation about transverse axes at positions longitudinally outwardly adjacent pulleys 84, 86. Pairs of vertically spaced pulleys 94, 96 and 97, 98 are similarly mounted for rotation about transverse axes at positions longitudinally outwardly adjacent pulleys 87, 88. Pulleys 99, 101 are mounted at the lower ends of the posts 33 disposed on the same side of the chassis as pulleys 91, 93. Pulleys 99, 101 are rotatable about transverse axes and are longitudinally aligned with pulleys 91, 93. Pulleys 102, 103 are similarly mounted at the lower ends of the posts on the opposite side of the chassis in longitudinal alignment with pulleys 96, 98. Pulleys 104, 106, 107, 108 are mounted at the upper ends of the post in respective vertical alignment with pulleys 99, 101, 102, 103. Cables 109 and 110 are secured to carriage fastener 77 and are led transversely outward around pulleys 79, 81, respectively. Cable 110 is in turn led around pulley 84, over pulley 89, under pulley 91, under pulley 99, and over pulley 104 into securance with the rod 32 slidably mounted in the corresponding post 33. Cable 109 is led around pulley 86, over pulley 92, under pulley 93, under pulley 101, and over pulley 106 into securance with the rod 32 at the opposite end of the chassis. In a similar manner, third and fourth cables 111 and 115 are secured to carriage fastener 78, and are respectively guided by pulleys 87, 94, 96, 102, 107 and by pulleys 88, 97, 98, 103, 108 into securance with the rods 32 slidably mounted in the posts 33 on the opposite side of the chassis.

With the elevating control system provided as just described, it will be appreciated that the ends of cables 109, 110, 111, and 115 secured to the posts 32 are simultaneously moved in pulling directions when the carriage 76 is translated towards the right end of cylinder 74 as viewed in FIGURE 7. The pull at the ends of the cables is exerted upward on the rods 32 to thereby move the frame 31 of the crane equipment to elevated positions relative to the top walls of the body portions 12, 13. Translation of the carriage 76 towards the left plays out the ends of the cables, and thus permits the frame 31 to descend by gravity to its normal position.

Considering now the crane equipment 23 in greater detail, reference is made to FIGURE 8 which illustrates a preferred structural arrangement for the hoist 24. More particularly, the hoist is carried by a carriage 112 which is translatable along a generally horizontal hoist rail 113. Rail 113 is coupled to a shaft 114 which depends from the gantry carriage 26 and is rotatable through 360°. Such arrangement provides an added degree of versatility in the positioning of the hoist 24 within the van as well as at locations beyond the ends thereof.

As previously noted, the invention is not limited to the above van embodiment. In this regard, reference is made to FIGURE 9 which depicts the invention embodied in an open van. This open van embodiment is the same as the closed van embodiment except that the side, end, and top walls of the body portions 12, 13 are disposed with such that only the base portions 17 remain.

In the embodiment of FIGURE 9, the bases are transversely translatable relative to chassis 14 in the manner previously described. While this construction is preferred to provide the aforementioned aisle, it will be appreciated that the elevatable crane equipment can be advantageously used to load and unload many types of cargo from an open vane as well as a closed one without the aisle being provided. Thus the van body need not be expandable in all instances.

FIGURES 10 and 12 depict another closed van embodiment of the invention. This embodiment is also generally the same as the previously described closed van embodiment, except that the top wall or roof 116 is secured to the crane assembly for elevation therewith. More particularly, roof 116 extends in overlying relationship between the longitudinal gantry rails 28. Roof 116 encompasses the longitudinal exterior sides of rails 28 and includes at each of its longitudinal edges an outwardly extending horizontal shelf 117 having a vertical flange 118 depending downward from its outer longitudinal edge. Flanges 118 extend for the length of the side walls 119 of the truck.

As shown in FIGURE 11 when the van is in its closed position, the roof shelves 117 rest upon the upper edges of side walls 119 with the flanges 118 exteriorly of such side walls. Roof 116 thus provides a "cap" which closes the top of the van. Flanges 118, besides protecting the joint between the roof and the side walls from the elements, prevent the side walls 119 from being forced outwardly by the van contents. In this connection, it should be noted that roof 116 has in transverse cross section an outwardly convex configuration, and has secured transversely thereof at spaced locations a plurality of stress plates having an arcuate edge in engagement with the interior surface of roof 116 and a linear edge above rail 28. This roof configuration and the plates cooperate to enhance the ability of flanges 118 to prevent outward movement of side walls 119.

When the crane assembly is elevated, the roof structure 116 moves upward therewith to the elevated position shown in FIGURES 10 and 12 wherein the flanges 118 do not obstruct outward movement of van side walls 119, and permit the van body to be extended. It will be noted that when the crane assembly and the roof are elevated, the whole top of the van is open. This permits free access of the crane to all parts of the interior of the van to facilitate loading and unloading thereof.

The crane assembly of this embodiment is elevatable, and the side and base body portions are transversely translatable, in the same manner as in the previously described embodiments.

What is claimed is:

1. A transporting vehicle comprising a chassis, a pair of half body portions including at least a pair of base portions mounted on said chassis for translation transversely thereof between first positions wherein the bases are in abutment and second positions wherein the bases are transversely separated, expansion control means carried by said chassis and coupled to said bases for selectively translating same between said first and second positions, crane equipment mounted on said chassis for vertical translation, and elevational control means carried by said chassis and coupled to said crane equipment for selectively translating same in opposite vertical directions, said transporting vehicle including a roof secured to said crane equipment for movement therewith in said opposite vertical directions.

2. A transporting vehicle according to claim 1, further defined by said expansion control means comprising pneumatically actuated cable pulling means carried by said chassis and selectively translatable between first and second opposite directions, cables secured to said pulley means, and pulley means guiding said cables into securance with said bases from directions to pull said bases transversely outward in response to translation of said pulling means in said first direction and to pull said bases transversely inward in response to translation of said pulling means in said second direction.

3. A transporting vehicle according to claim 1, further defined by said crane equipment comprising a rectangular frame including parallel spaced longitudinal side rails, a transverse gantry mounted between said side rails for translation longitudinally thereof, a carriage mounted on said gantry for translation therealong, a hoist carried by said carriage, posts extending upward from the corners of said chassis, and rods depending from said frame mounted in said posts in vertical slidable relation thereto.

4. A transporting vehicle according to claim 1, further defined by said elevational control means comprising pneumatically actuated cable pulling means carried by said chassis and selectively translatable between first and second opposite directions, cables secured to said pulling means, and pulley means guiding said cables into securance with said crane equipment from a direction to raise said crane equipment in response to translation of said pulling means in said first direction and to lower said crane equipment in response to translation of said pulling means in said second direction.

5. A transporting vehicle comprising a chassis, a pair of half body portions including at least a pair of base portions mounted on said chassis for translation transversely thereof between first positions wherein the bases are in abutment and second positions wherein the bases are transversely separated, expansion control means carried by said chassis and coupled to said bases for selectively translating same between said first and second positions, crane equipment mounted on said chassis for vertical translation, and elevational control means carried by said chassis and coupled to said crane equipment for selectively translating same in opposite vertical directions, said crane equipment comprising a rectangular frame including parallel spaced longitudinal side rails, a transverse gantry mounted between said side rails for translation longitudinally thereof, a carriage mounted on said gantry for translation therealong, a hoist carried by said carriage, posts extending upward from the corners of said chassis, rods depending from said frame mounted in said posts in vertically slidable relation thereto, a pivotal rail coupled to a shaft depending from said carriage and rotatable through 360°, and a second carriage mounted for translation along said pivotal rail, said second carriage carrying said hoist.

6. A transporting vehicle according to claim 1 further defined by each of said body portions having a side wall extending upwardly from the margin of the base portion thereof and said roof including downwardly extending side flanges which extend exteriorly of the upper edges of siad side walls when said roof and crane equipment are in a lower vertical position.

7. A transporting vehicle comprising a chassis, a van body having a base, crane equipment mounted on said chassis vertically spaced above said base, and elevational control means coupled to said crane equipment for selectively translating same in opposite vertical directions, said crane equipment including a hoist and mounting means for selectively translating said hoist longitudinally of said base from one end to the other beyond at least one end edge thereof and transversely of said base from one side to the other beyond a side edge thereof, said crane equipment comprising a rectangular frame including parallel spaced longitudinal side rails, a transverse gantry mounted between said side rails for translation longitudinally thereof, a carriage mounted on said gantry for translation therealong transversely relative to said longitudinal side rails, a generally horizontal hoist rail depending from said carriage and rotatable with respect thereto 360° in a horizontal plane, said hoist being carried by said rail and translatable therealong.

8. A transporting vehicle comprising a chassis, a van body having a base, crane equipment mounted on said chassis vertically spaced above said base, elevational control means coupled to said crane equipment for selectively translating same in opposite vertical directions, said crane equipment including a hoist and mounting means for selectively translating said hoist longitudinally of said base from one end of the other and transversely of said base from one side to the other, said base including a pair of base portions mounted on said chassis for translation transversely thereof between first positions wherein the base portions are adjacent one to another and second positions wherein the base portions are transversely separated and form an aisle therebetween, and expansion control means carried by said chassis and coupled to said base portion for selectively translating same between said first and second positions, said hoist being selectively translatable by said mounting means longitudinally of said base beyond an end edge thereof.

References Cited

UNITED STATES PATENTS

| | | |
|---|---|---|
| 2,177,525 | 10/1939 | Henderson. |
| 2,704,223 | 3/1955 | Houdart _____ 296—26 |
| 3,051,419 | 8/1962 | Weiland et al. |
| 3,211,306 | 10/1965 | Nissen et al. |
| 3,341,986 | 9/1967 | Brosig _____ 296—26 XR |

ROBERT G. SHERIDAN, Primary Examiner

U.S. Cl. X.R.

212—74; 296—26